United States Patent [19]
Kagami et al.

[11] Patent Number: 5,479,443
[45] Date of Patent: Dec. 26, 1995

[54] HYBRID DIGITAL RADIO-RELAY SYSTEM

[75] Inventors: Osamu Kagami; Kazuji Watanabe; Kozo Morita, all of Kanagawa, Japan

[73] Assignee: Nippon Telegraph and Telephone Corporation, Tokyo, Japan

[21] Appl. No.: 133,337

[22] Filed: Oct. 8, 1993

[30] Foreign Application Priority Data

Oct. 9, 1992 [JP] Japan .................................. 4-296661
Oct. 9, 1992 [JP] Japan .................................. 4-296662

[51] Int. Cl.$^6$ .......................... H04B 7/165; H04B 7/17; H04J 1/10
[52] U.S. Cl. .......................... 375/211; 455/13.1; 455/23; 370/75; 375/349
[58] Field of Search .............................. 375/3, 3.1, 102, 375/347, 349, 211, 215, 214; 455/7, 13.1, 17, 23; 370/75

[56] References Cited

U.S. PATENT DOCUMENTS

| | | | |
|---|---|---|---|
| 4,132,952 | 1/1979 | Hange et al. | 325/459 |
| 4,606,054 | 8/1986 | Amitay et al. | 375/102 |
| 4,742,530 | 5/1988 | Kawai | 375/4 |
| 4,789,993 | 12/1988 | Ryu | 375/4 |

OTHER PUBLICATIONS

"Development of NNI Digital Radio", Murase et al., NTT Review, vol. 1, No. 3, Sep. 1989, pp. 77–83.
"Performance of a Transversal Equalizer for Self–Interference Passing Adjacent Channels", Kagami et al., JP Electronics, Information and Communication Institute, B–II, vol. J 75–B–II, No. 8, Aug. 1992, p. 508–514.
"Coherent Non–Regenerative Repeater Digital Microwave Radio System Field Test", Watanabe et al., IEEE Communications Society, IEEE Global Telecommunications Conference, Dec. 6–9, 1992, pp. 1846–1850.

Primary Examiner—Stephen Chin
Assistant Examiner—William Luthur
Attorney, Agent, or Firm—Nikaido, Marmelstein, Murray & Oram

[57] ABSTRACT

A digital radio-relay system has a transmitting terminal station, at least one repeater station a receiving terminal station, a non-regenerative repeater station which does not regenerate a digital signal in order to simplify and reduce cost of the system, while keeping excellent signal quality in transmission. Each repeater station has a plurality of sub-units relating to respective sub-system signals each having a plurality of carriers so that the frequency spectrum of each sub-system signal is allocated on a frequency axis based upon a frequency division multiplex system. A repeater station having a first frequency converter to convert a received radio frequency to IF frequency, bandpass filters for deriving one of the carriers in each sub-system signal, amplifiers to amplify the derived carrier on IF band stage, and a second frequency converter to convert the IF frequency to radio frequency, has a common reference oscillator which generates a reference frequency which is a common divisor of all the local frequencies for all the radio frequencies of all the sub-system signals. Only one of an upper and lower heterodyne signals is taken in all the frequency conversions, so that distortion in each relay section is added in-phase. Leaked noise caused by the bandpass filters is added to original carrier in-phase. All the distortion thus added in the relay sections can be compensated by a transversal equalizer in the receiving terminal station. Therefore, excellent signal quality is obtained although a simple non-regenerative repeater station is used.

12 Claims, 13 Drawing Sheets

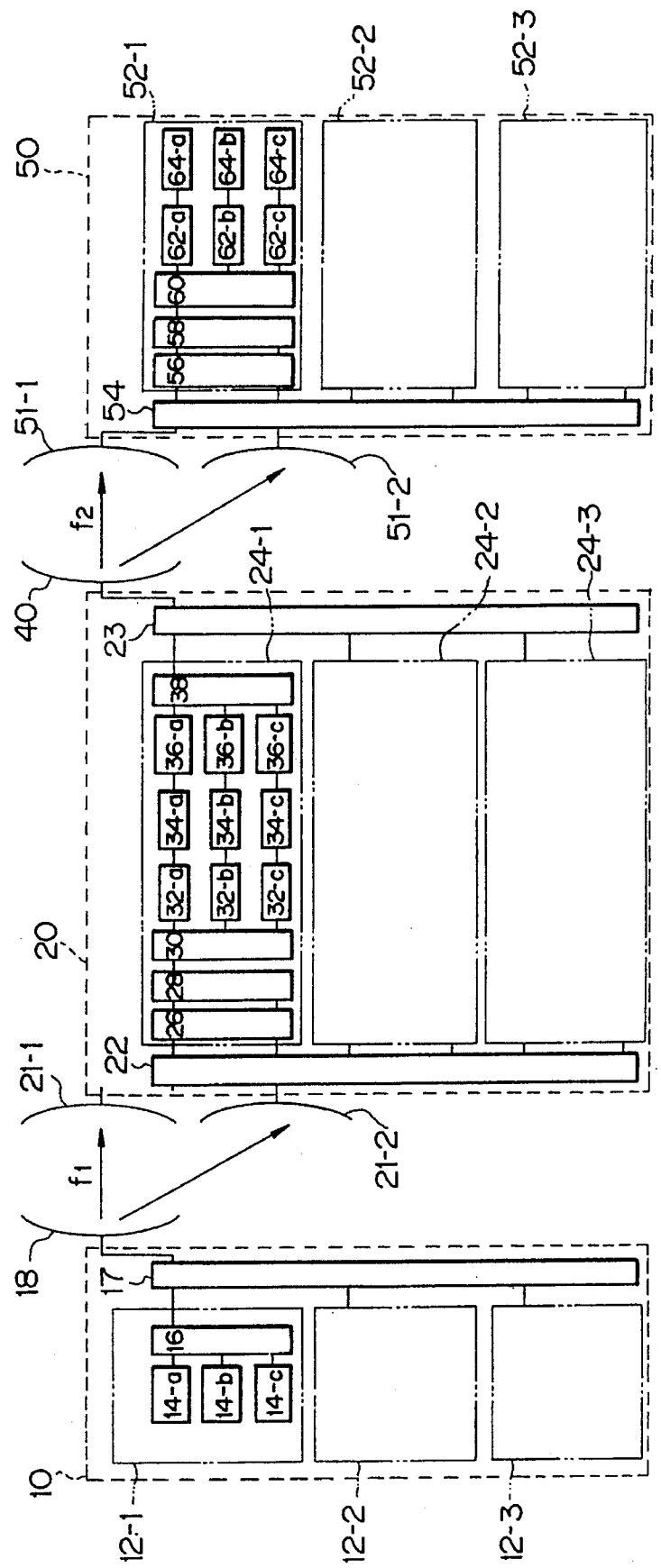

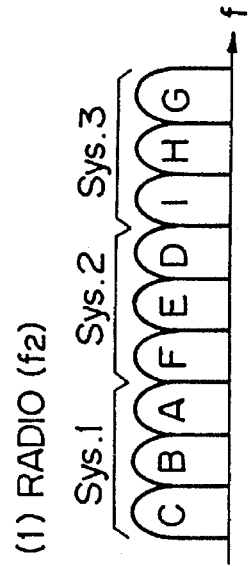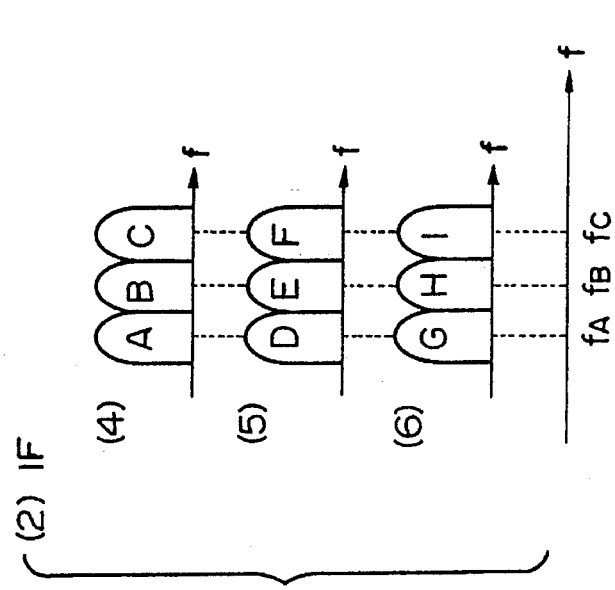
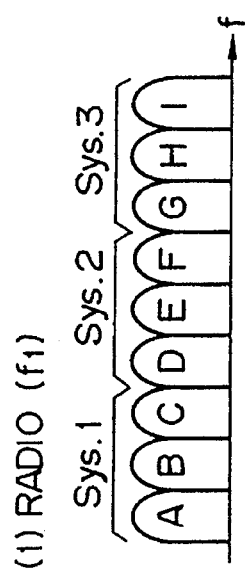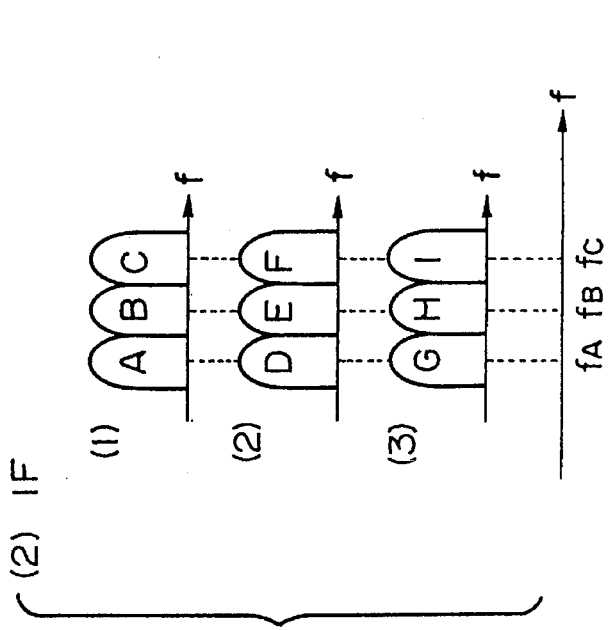

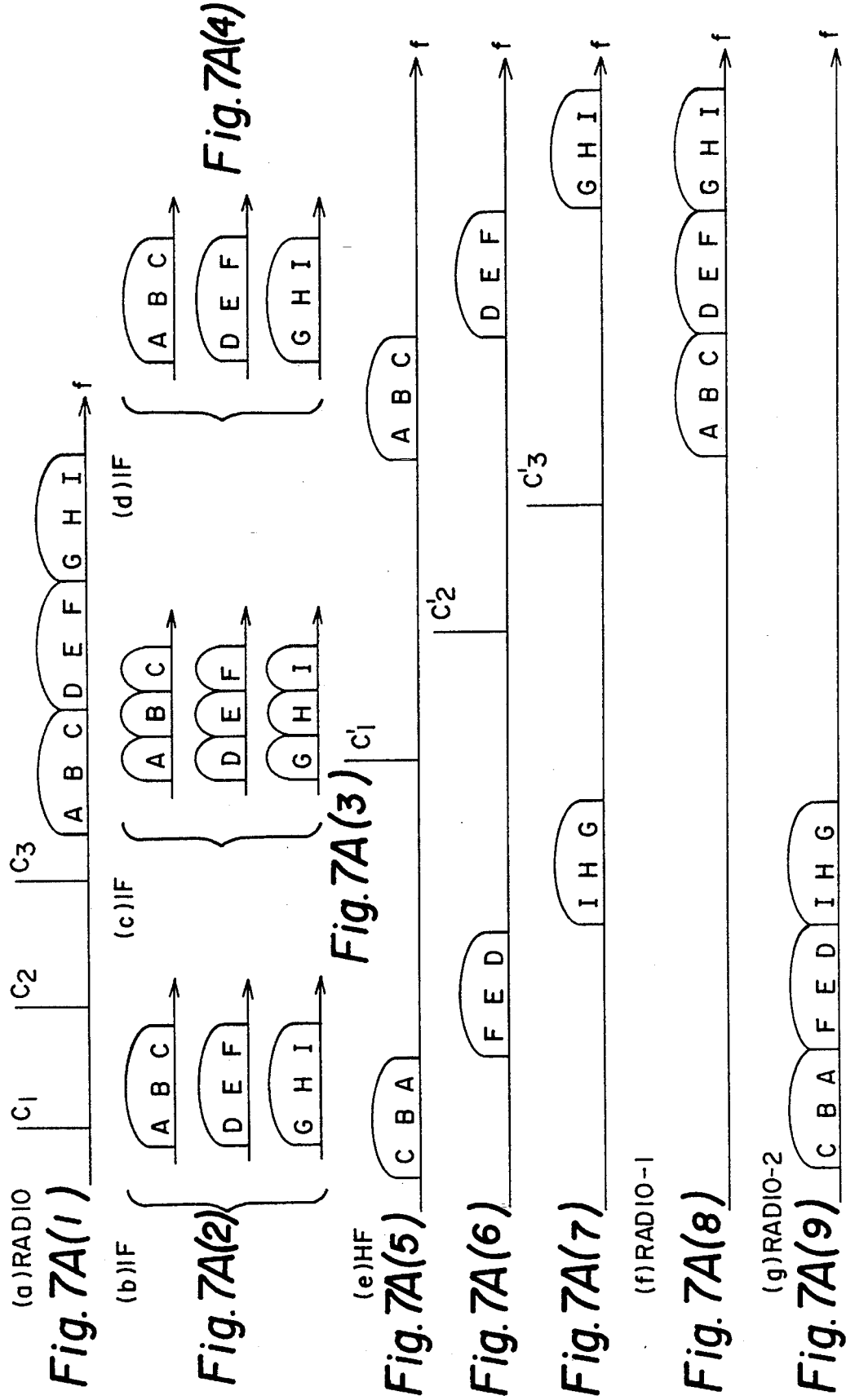

Fig. 7B(a)
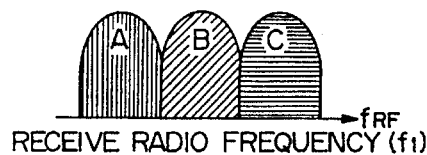
RECEIVE RADIO FREQUENCY (f1)
Fig. 7B(b)
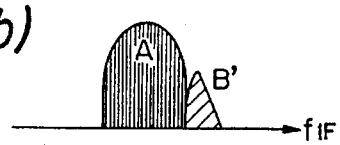
Fig. 7B(b')
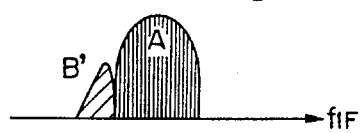
Fig. 7B(c)
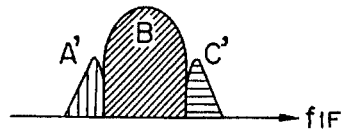
Fig. 7B(c')
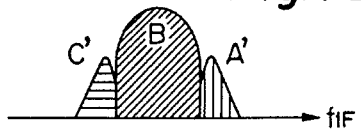
Fig. 7B(d)
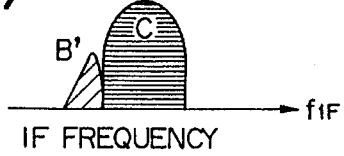
IF FREQUENCY
Fig. 7B(d')
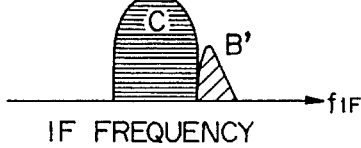
IF FREQUENCY
Fig. 7B(e)
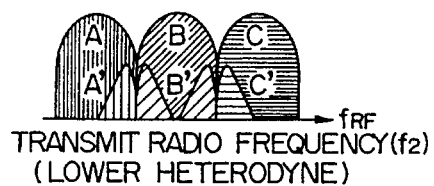
TRANSMIT RADIO FREQUENCY(f2)
(LOWER HETERODYNE)
Fig. 7B(e')
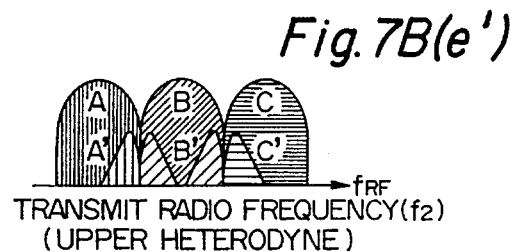
TRANSMIT RADIO FREQUENCY(f2)
(UPPER HETERODYNE)

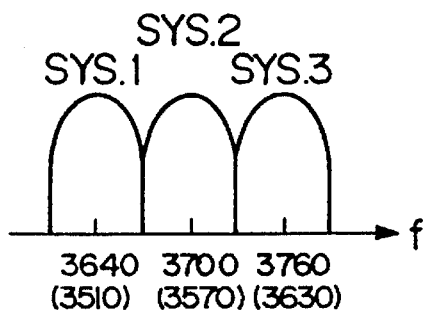
Fig. 9a
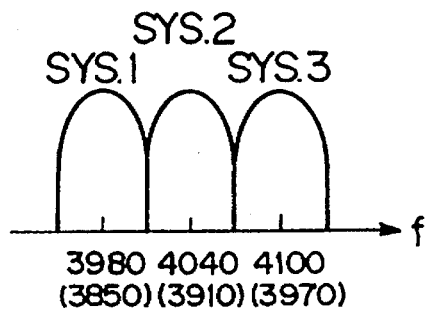
Fig. 9a(1)
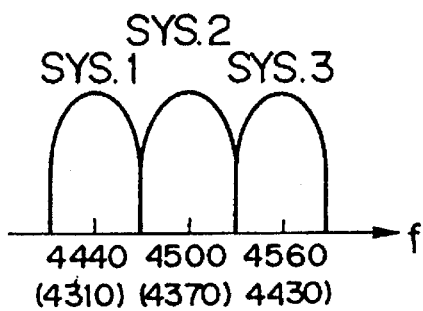
Fig. 9b
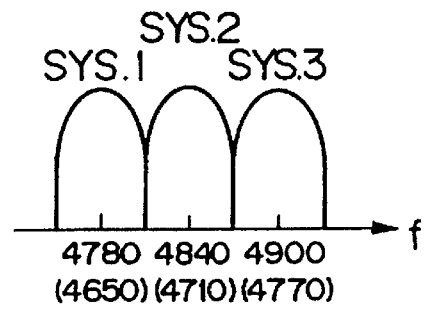
Fig. 9b(1)
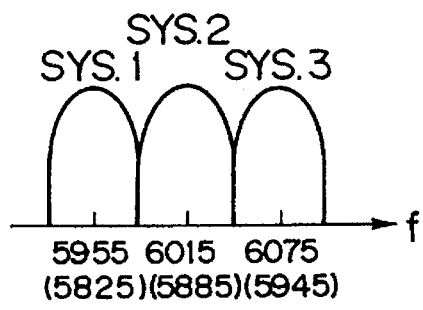
Fig. 9c
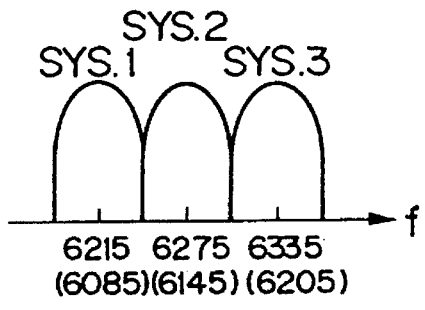
Fig. 9c(1)

HYBRID DIGITAL RADIO-RELAY SYSTEM

BACKGROUND OF THE INVENTION

The present invention relates to a hybrid digital radio-relay system which has a transmitting terminal station, at least one repeater station, and a receiving terminal station, in particular, relates to such a system in which at least one repeater station is a non-regenerative repeater station which does not regenerate a digital signal, and distortion generated during relay sections is compensated or equalized in a receiving terminal station and/or a regenerative repeater station. A hybrid system in the present invention means that both a non-regenerative repeater station and a regenerative repeater station (or a regenerative receiving terminal station) are used.

Because of the latest development of a digital radio-relay system, the cost, the consumed electric power, and the maintenance time of the system have been increased. The main reason of those problems is that a conventional digital radio-relay system uses a regenerative repeater station which regenerates a digital signal in each repeater station, so that distortion and/or symbol error is equalized in each repeater station, and excellent communication quality is obtained.

However, a regenerative repeater station must have demodulators and modulators, and an equalizer, and therefore, it has the disadvantage that the structure of a repeater station is complicated.

Therefore, a non-regenerative repeater station which does not regenerate a digital signal in each repeater station and all the distortion is equalized in a receiving terminal station is promising. As fading in a relay section occurs at random, and the probability that fading occurs in a plurality of relay sections at the same time is very small, a non-regenerative relay system which equalizes at a receiving terminal station may have the similar transmission quality to that of a regenerative relay system which equalizes in each repeater station.

FIG. 1 shows a block diagram of a prior regenerative digital radio-relay system, which uses a multi-carrier system, having three carriers in the embodiment.

It is assumed in the embodiments that there are three sub-system signals (sys.1, sys.2 and sys.3) each having three carriers (A, B and C) on both a go-channel and a return-channel.

The transmitting terminal station 10 has three transmitter sub-units 12-1, 12-2 and 12-3, relating to a sub-system signal, and each transmitter sub-unit has three modulators 14-a, 14-b, and 14-c for modulating carriers A, B and C, respectively, and a transmitter 16 for frequency conversion to radio frequency $f_1$ and high power amplification. The outputs of the transmitter sub-units are combined in the band splitter filter 17, and transmitted towards a repeater station through an antenna 18.

A regenerative repeater station 20 has a pair of antennas 21-1 and 21-2 to receive radio frequency $f_1$, a band splitting filter 22 for separating each sub-system signals, three repeater sub-units 24-1, 24-2 and 24-3, another band splitting filter 23 for combining outputs of the repeater sub-units, and an antenna 40 which transmits signal towards a next repeater station or a receiving terminal station.

Each repeater sub-unit (24-1, 24-2, 24-3) has a receiver 26 for converting radio frequency to intermediate frequency (IF), a diversity combiner 28 for combining two received signals based upon conventional diversity process, an auto-gain controller 30 for amplifying received signal, three demodulators 32-a, 32-b and 32-c relating to three carriers for demodulating signals, three transversal equalizers 34-a, 34-b and 34-c for equalizing waveform distortion added to demodulated signals, three modulators 36-a, 36-b and 36-c for modulating signals, and a transmitter 38 for frequency conversion from IF frequency to radio frequency $f_2$. The outputs of the sub-units are combined in the band splitting filter 23, and are transmitted to the next repeater station or a receiving terminal station through an antenna 40.

A receiving terminal station 50 has a pair of antennas 51-1 and 51-2 to receive radio signal, a band splitting filter 54 for separating sub-system signals, and three receiver sub-units 52-1, 52-2 and 52-3. Each receiver sub-unit has a receiver 56 for converting radio frequency $f_2$ to intermediate frequency, a diversity combiner 58, an auto-gain controller 60, three demodulators 62-a, 62-b and 62-c, and three transversal equalizers 64-a, 64-b and 64-c.

FIG. 2 shows frequency allocation in a repeater station of FIG. 1. The received radio signal of frequency $f_1$ has three sub-system signals sys.1, sys.2 and sys.3, each having three carriers (A, B and C et al).

In the frequency conversion from IF frequency to radio frequency or radio frequency to IF frequency, the transmitter 16 in the transmitting terminal station 10, and the receiver 26 in the repeater station 20 take a lower heterodyne in the frequency conversion, and the transmitter 38 in the repeater station 20 and the receiver 56 in the receiving terminal station 50 take an upper heterodyne.

The frequency conversion from radio frequency to IF frequency and vice versa is to mix the signal with a local frequency. It should be noted that two side bands are obtained in the mixing process, and one of the side bands are taken.

An upper heterodyne is defined so that the local frequency is higher than the selected side band signal.

A lower heterodyne is defined so that the local frequency is lower than the selected side band signal.

In the embodiment of FIG. 2, a lower heterodyne is taken and three sub-system signals (sys1; A,B,C), (sys2; D,E,F) and (sys3; G,H,I) each having three carriers (A, B, C et al) are obtained. $f_A$, $f_B$ and $f_C$ are carrier frequencies of each carriers.

The transmitter 38 converts the IF frequency to the radio frequency $f_2$. An upper heterodyne is taken in this case, so that the local frequency for frequency conversion is allocated within an assigned frequency band. In other words, when a receiver takes a lower heterodyne, a transmitter takes a higher heterodyne, and when a receiver takes an upper heterodyne, a transmitter takes a lower heterodyne. Therefore, the frequency allocation of three carriers in each sub-system signal in the transmitted signal is opposite to those of the received signal. It should be noted for instance that the sub-system signal sys.1 has the allocation A, B and C in frequency $f_1$, on the other hand, it has the allocation C, B and A in frequency $f_2$.

A regenerative repeater station regenerates a digital signal, and therefore, all the distortion in the propagation path is completely compensated in each repeater station.

However, when a non-regenerative repeater station is used, distortion and/or interference is not compensated in a repeater station. This is explained in accordance with FIGS. 3 and 4.

FIG. 3 shows a prior non-regenerative repeater station 80, which has a pair of antennas 80-1 and 80-2 for space diversity, a band splitting filter 82 for separating sub-system signals, three repeater sub-units 86-1, 86-2 and 86-3, another band splitter filter 84 for combining outputs of three sub-units, and an antenna 99.

Each sub-unit has a receiver 88 for converting received radio frequency to IF frequency, a diversity combiner 90, an auto-gain controller 92 for amplifying IF frequency signal, and a transmitter 98 which converts IF frequency to radio frequency.

The auto-gain controller 92 has a hybrid circuit (H) for separating three carriers, three bandpass filters each having center frequency $F_1$, $F_2$, and $F_3$ for taking only one carrier (A, B, C et al), three auto-gain controllers $A_1$ $A_2$, $A_3$ for amplifying carriers, and an adder 96 for combining three carriers.

It should be noted that a bandpass filter is not ideal, but has a wider pass band than that of a carrier, therefore, a part of the adjacent carrier leaks into the desired carrier which passes the bandpass filter. In FIG. 4, (1) shows that the carrier A is accompanied by undesired (b) which is a part of the adjacent carrier B. Similarly, (2) shows that the carrier B has a part of the adjacent carriers A and C. Similarly, the carriers A through I accompany a part of undesired carriers as shown in (1) through (9) in FIG. 4, because of non-ideal characteristics of a bandpass filter.

When three carriers are combined in the adder 96, the frequency allocation of each carriers is shown in (10), (11) and (12) in FIG. 4.

Then, when three sub-system signals (10), (11) and (12) are frequency converted from IF frequency to radio frequency, the frequency allocation is shown in (13) in FIG. 4. It should be noted in (13) that undesired noise (g) which is a part of the carrier G is included in the carrier A, and undesired noise (c) is included in the carrier I. Those undesired noises can not be compensated by an equalizer in a receiving terminal station, since A and G are different signals from each other. On the other hand, the carriers B and C, et al are compensated by an equalizer, since the leak noise (d) at the side of (C) is removed by a roll-off filter in a demodulator, and the leak noises (c) in (C), and (b) in (B) are combined in-phase as those signals as they are the same signals as one another.

It should be noted that the frequency allocation (13) in FIG. 4 shows the case of only one relay section. When many relay sections are used, the interference is complicated, and many unequalizable interferences are generated.

The leaked noise including undesired interference (g) and (c) in FIG. 4 is called Self-Interference caused by Passing Adjacent Channels (S-IPAC) in the present specification.

Because of the unequalizable interferences, a non-regenerative radio-relay system has not been used.

SUMMARY OF THE INVENTION

It is an object, therefore, of the present invention to overcome the disadvantages and limitations of a prior digital radio-relay system by providing a new and improved hybrid digital radio-relay system.

It is also an object of the present invention to provide a hybrid digital radio-relay system, in which at least one repeater station is a non-regenerative repeater station, and self-interference caused by passing adjacent channels is compensated in a regenerative repeater station, or a receiving terminal station.

It is also an object of the present invention to provide a hybrid digital radio-relay system, in which cross polarization interference is compensated while using a non-regenerative repeater station.

The above and other objects are attained by a hybrid digital radio-relay system comprising; a transmitting terminal station having a plurality of transmitter sub-units for respective sub-system signals, each sub-unit having a modulator for modulating signal, and a transmitter for converting frequency of modulated signal to radio frequency and providing high transmitting power, and a band splitting filter for combining radio signals of all the sub-units to transmit from an antenna; at least one repeater station having a band splitting filter for separating received signal to a plurality of sub-system signals applied to respective repeater sub-units, each having a first frequency converter for converting received radio frequency to IF frequency, an auto-gain controller having an amplifier, and a second frequency converter for converting amplified IF frequency to radio frequency, and another band splitting filter for combining radio signals of all the sub-units to transmit from an antenna; a receiving terminal station having a band splitting filter for separating received signal into sub-system signals applied to respective receiver sub-units, each having a receiver for converting received radio frequency to IF frequency which is subject to detection, a demodulator for demodulating received signal, and an equalizer coupled with output of the demodulator for equalizing waveform distortion of signal during propagation between the transmitting terminal station and the receiving terminal station; wherein at least one repeater station is a non-regenerative repeater station which does not regenerate digital symbol of modulated signal; the non-regenerative repeater station has a common reference oscillator which supplies a local frequency to the first frequency converter of all the sub-units and the second frequency converter of all the sub-units with in-phase condition; and the second frequency converter takes the same heterodyne selected from an upper and lower heterodyne as that of the first frequency converter, so that interference caused by an adjacent sub-system signal leaked into the sub-system signal is compensated by the equalizer in the receiving terminal station.

BRIEF DESCRIPTION OF THE DRAWINGS

The foregoing and other objects, features, and attendant advantages of the invention will be appreciated as the same become better understood by means of the following description and accompanying drawings wherein;

FIG. 1 is a block diagram of a prior radio-relay system,

FIG. 2 shows frequency allocation in FIG. 1,

FIGS. 7A and 7B show frequency allocation for the explanation of the operation of the present invention, FIG. 9 shows a numerical embodiment of frequency allocation in the present invention.

DESCRIPTION OF THE PREFERRED EMBODIMENTS

Figure 3:
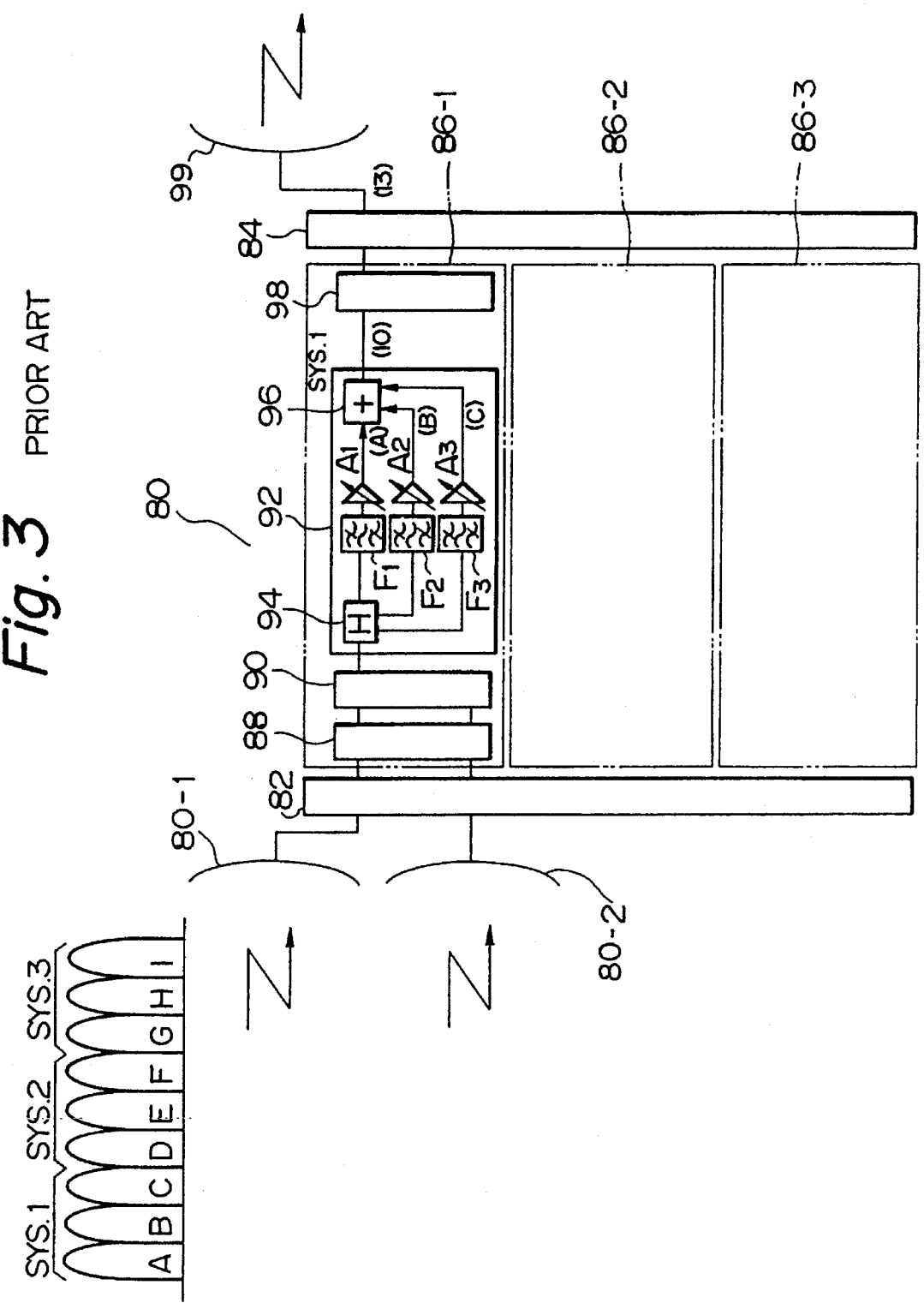
FIG. 3 is a block diagram of another prior radio relay system.
Figure 4:
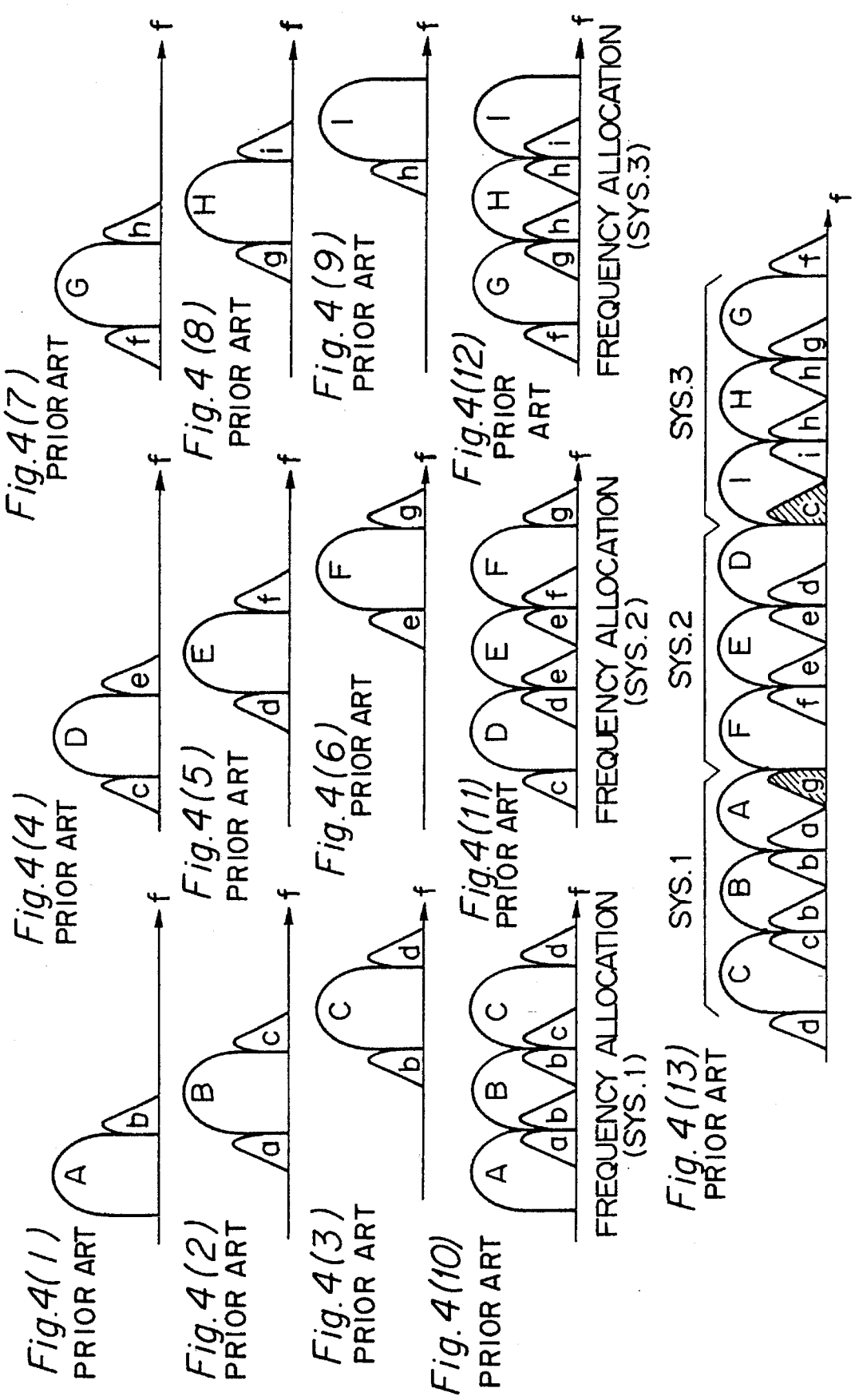
FIG. 4 shows frequency allocation for the explanation of interference by another sub-system in FIG. 3.
Figure 5:
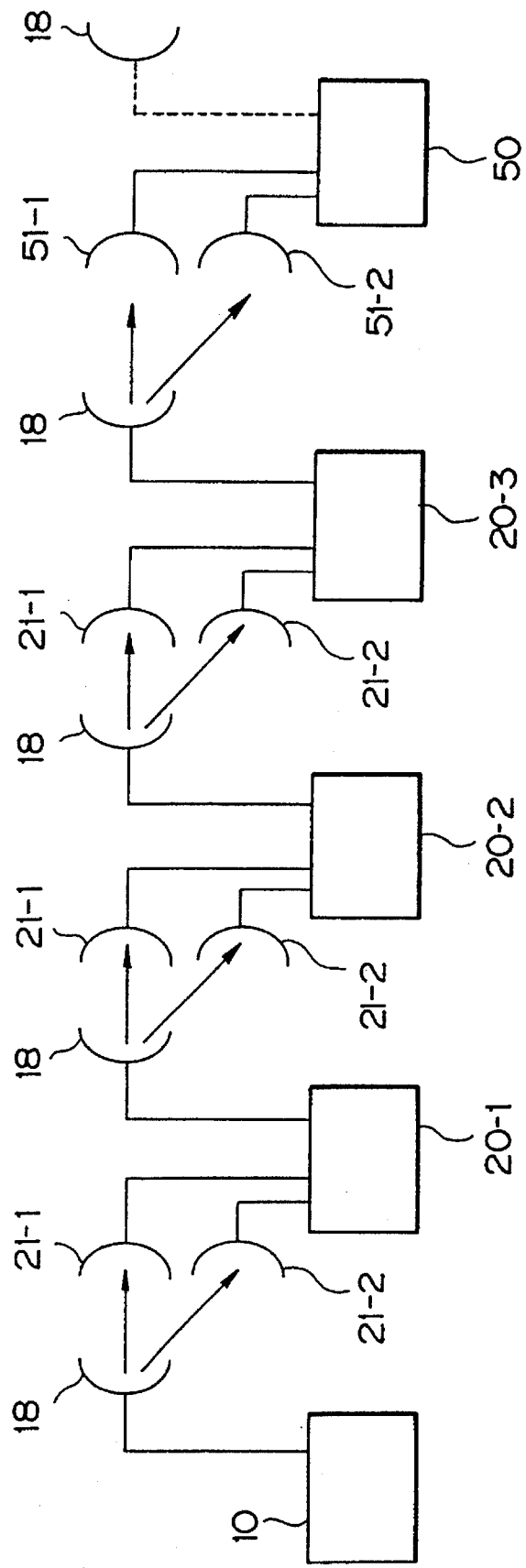
FIG. 5 shows a hybrid radio-relay system which the present application is applied to, FIG. 6A is a block diagram of a hybrid digital radio-relay system according to the present invention.

FIG. 5 shows a hybrid digital radio-relay system according to the present invention, in which three non-regenerative repeater stations are for four hops. The system has a transmitting terminal station 10, three non-regenerative repeater stations 20-1, 20-2, and 20-3, and a regenerative repeater station or a receiving terminal station 50. When the station 50 is a regenerative repeater station, it relays a signal to another non-regenerative repeater station. The modulated radio signal generated in the transmitting terminal station 10 is transmitted to the first non-regenerative repeater station 20-1 through an antenna 18. The non-regenerative repeater station 20-1 a) receives the radio signal by a pair of antennas 21-1 and 21-2 so that a space diversity process is used which effects auto-gain control for compensating level variation in the propagation path at the intermediate frequency (IF) band, and then b) transmits to the second non-regenerative repeater station 20-2 through an antenna 18. The second repeater station 20-2 and the third repeater station 20-3 effect a similar operation to that of the first repeater station 20-1. The regenerative repeater station or the receive terminal station 50 receives the signal by using a pair of antennas 51-1 and 51-2, effects the space diversity process at IF band, demodulates the signal, and effects the complete equalization for compensating cumulative waveform distortion during the propagation path from the transmitting terminal station 10. When the station 50 is a repeater station, it modulates the equalized signal again, and transmits to a next repeater station.

It should be appreciated in FIG. 5 that a repeater station is a non-regenerative repeater station, which does not demodulate the receive signal, nor equalize the received signal, and that the cumulative distortion which were compensated in each regenerative repeater station in a prior art of FIG. 1 is compensated in a receiving terminal station or a regenerative repeater station which is located in every several repeater stations. Therefore, the present invention provides the excellent signal quality similar to that in a conventional complicated regenerative radio-relay system.

Figure 6A:
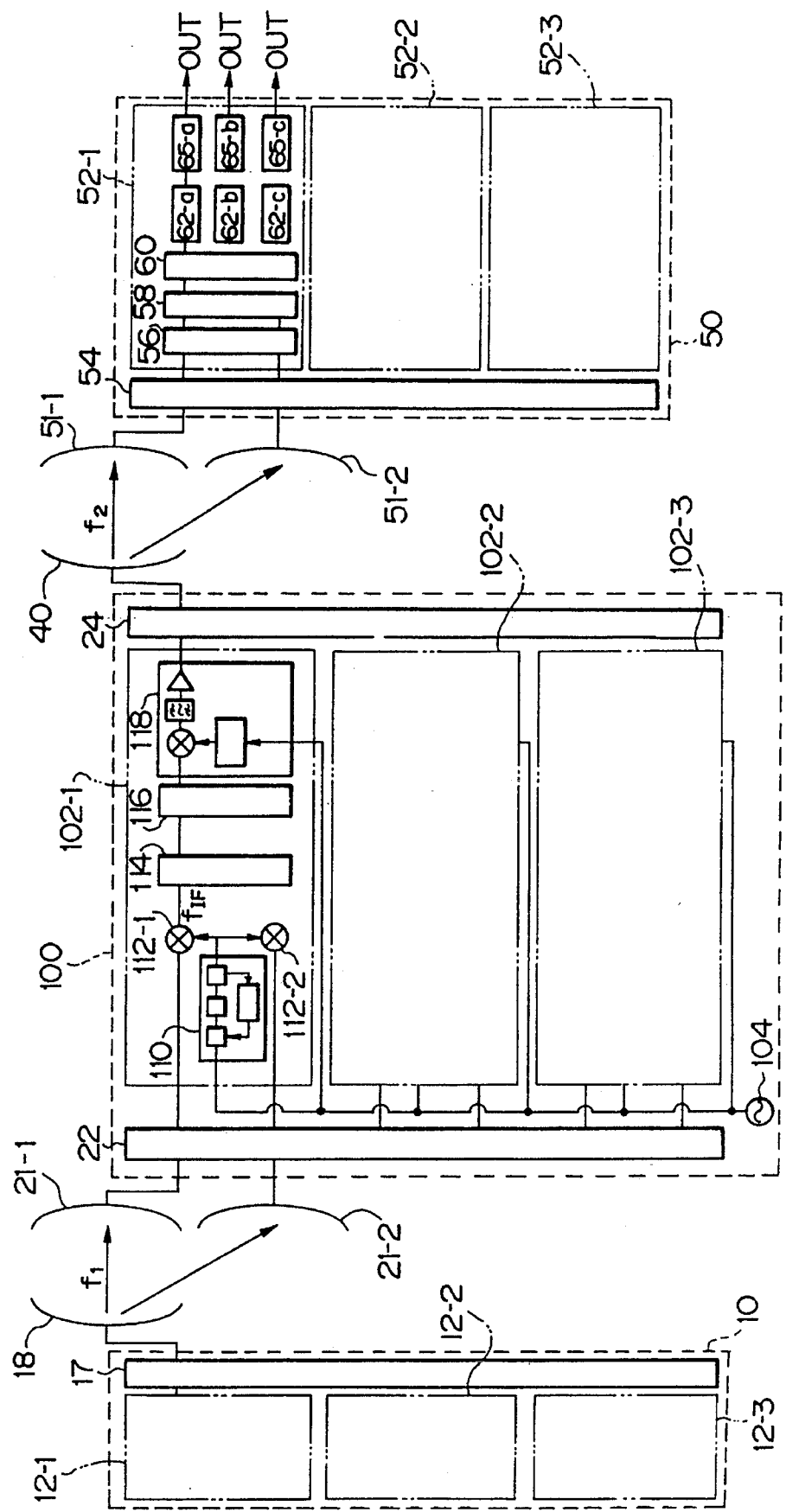
FIG. 6B is a block diagram of a relay-unit 102-1 FIG. 6A.
FIG. 6C shows a modification of a local oscillator.

FIG. 6A is a block diagram of a non-regenerative digital radio-relay system according to the present invention. FIG. 6A shows the case of a single repeater station.

In FIG. 6A, a transmitting terminal station 10 is the same as 10 in FIG. 1 for regenerative radio-relay system, and has three transmitters 12-1, 12-2 and 12-3 for three sub-system signals, which are combined in the band splitting filter 17. The radio wave of frequency $f_1$ is transmitted towards a repeater station through an antenna 18.

A non-regenerative repeater station 100 has a pair of antennas 21-1 and 21-2 for space diversity combination, each of which is coupled with a band splitting filter 22, which separates the sub-system signals. The outputs of the band splitting filter 22 are applied to three repeater sub-units 102-1, 102-2 and 102-3, each of which carries out the first frequency conversion from radio frequency to IF frequency, the space diversity combination, auto-gain control, and the second frequency conversion from IF frequency to radio frequency $f_2$ together with power amplification. The outputs of those repeater sub-units are combined in another band splitting filter 24, the output of which is transmitted through an antenna 40 towards another repeater station, or a receiving terminal station.

The numeral 104 in FIG. 6A is a common reference oscillator, which supplies to all the repeater sub-units so that each sub-system signal is frequency converted by a local frequency which is in-phase with another local frequency for another sub-system signal. It should be appreciated that the presence of a common reference oscillator is one of the features of the present invention. FIG. 6A shows the embodiment that both the first frequency conversion and the second frequency conversion in each sub-unit are supplied the common reference frequency.

Figure 6B:
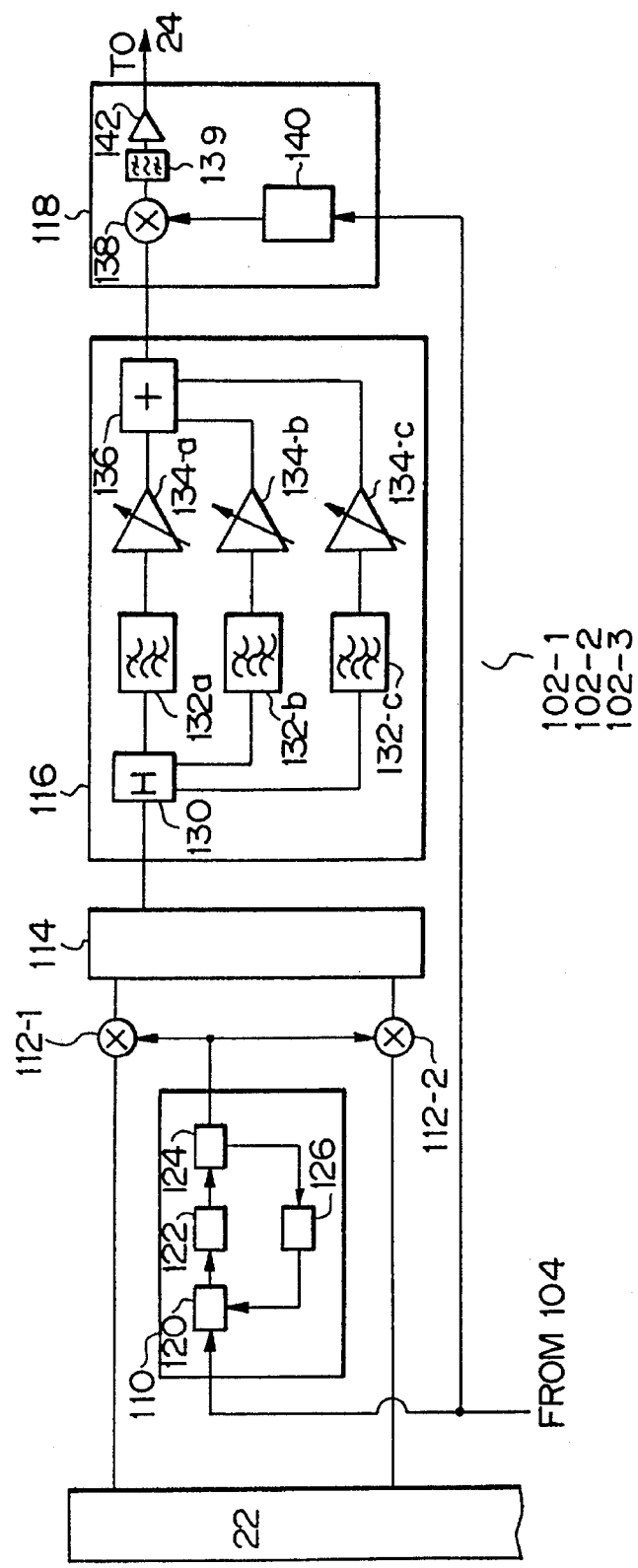

FIG. 6B shows a block diagram of a repeater sub-unit 102-1, 102-2 or 102-3, which is the same as one another. Each sub-unit processes the related sub-system signal.

In FIG. 6B, the numeral 110 is a phase lock loop having a phase comparator 120, a low pass filter 122 coupled with output of the phase comparator 120, a voltage controlled oscillator 124 coupled with output of the low pass filter 122, and a frequency divider 126 coupled between output of the oscillator 124 and an input of the phase comparator 120, which also receives a common reference frequency from the reference oscillator 104. The structure of the phase lock loop 110 is conventional, and it provides a local frequency to frequency mixers 112-1 and 112-2 for a first frequency conversion from a radio frequency to IF frequency.

It should be appreciated that all the phase lock loops for all the sub-system signals are supplied with the common reference frequency, and therefore, the local frequency for all the sub-system signals are in-phase with one another.

Preferably, the common reference frequency is a common divisor of all the local frequencies for all the radio frequencies for all the sub-system signals.

The IF signals thus frequency converted are applied to the space diversity combiner 114. The space diversity system itself is conventional.

The numeral 116, coupled with the output of the diversity combiner, is an auto-gain controller which amplifies the signal at IF band. The auto-gain controller 116 has a hybrid circuit 130 for separating three carriers, each of which is applied to the related auto-gain amplifier 134-a, 134-b or 134-c, through the related bandpass filter 132-a, 132-b or 132-c, respectively. In a modification, the hybrid circuit 130 may be installed in the diversity combiner 114, instead of the auto-gain controller. Each bandpass filter derives the related carrier, however, it should be appreciated that a part of adjacent carrier leaks into the output of each bandpass filter because characteristics of a bandpass filter are not ideal. The attenuation of level of each carrier is compensated by the auto-gain amplifiers. The outputs of those amplifiers are combined in the adder 136.

In the embodiment of FIG. 6A, three bandpass filters and three auto-gain controllers are used for three carriers, so that each carrier is well repeated in spite of selective fading.

The transmitter 118 carries out the second frequency conversion from IF frequency to radio frequency $f_2$ for the IF signal at the output of the adder 136. The transmitter 118 has a frequency mixer 138, a phase lock oscillator 140 which supplies the local frequency to the mixer 138 based upon the reference frequency of the reference oscillator 104, a bandpass filter 139 for deriving one of an upper heterodyne and a lower heterodyne from the output of the mixer 138, and a power amplifier 142, which is coupled with the band splitting filter 24.

Figure 6C:
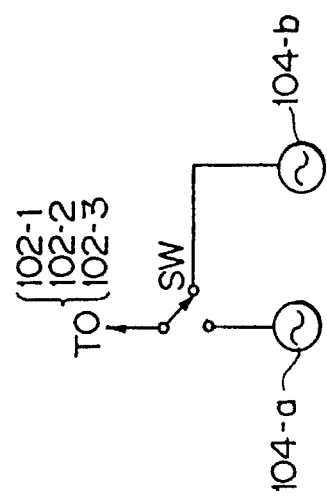

FIG. 6C shows a modification of a common reference oscillator. FIG. 6C has a pair of oscillators 104-a and 104-b, and a switch SW for supplying one of the outputs of the oscillators 104-a and 104-b to the sub-units 102-1, 102-2 and 102-3. The reference oscillators are switched when the oscillator in operation mode is in trouble. FIG. 6C has the advantage that the operational reliability of a common reference oscillator is improved.

Returning to FIG. 6A, the numeral 50 is a receiving terminal station, which has a pair of antennas 51-1 and 51-2 for space diversity combination, a band splitting filter 54 for separating three sub-system signals, three receiver sub-units 52-1, 52-2 and 52-3 coupled with a related sub-system signal. Each receiver sub-unit has a receiver 56 for frequency conversion from radio frequency to IF frequency, a space diversity combiner 58 for combining received signals, an auto-gain controller 60 for compensating level attenuation in the propagation path, three demodulators 62-a, 62-b and 62-c for demodulating each related carrier, and three transversal equalizers 65-a, 65-b and 65-c for equalizing the related demodulated signal. The equalized signal is an output signal OUT of a receive terminal station.

The numeral 50 may be a regenerative repeater station. In that case, the demodulated output signal is modulated again and transmitted towards another repeater station.

The structure of a receive terminal station 50 in FIG. 6A is essentially the same as 50 in the conventional system in FIG. 1, except that a transversal filter 65 is more powerful than that in a conventional regenerative system, since a transversal equalizer in the present invention must equalize not only distortion due to fading, but also distortion caused by self interference by another sub-system signal, and/or another carrier. The distortion and the self interference were compensated by each regenerative repeater station in a prior art. Therefore, when a transversal equalizer is implemented by a transversal filter which has a plurality of delay lines with taps at each connection point of adjacent taps, the number of taps is preferably larger than 14 in the present invention. The number of taps of a transversal equalizer in a prior regenerative repeater system is for instance 7. Alternatively, a transversal equalizer in the present invention is implemented by a decision feedback equalizer.

Now, the operation of the present system is explained in accordance with FIGS. 7A and 7B.

In FIG. 7A, (a) shows frequency allocation of a received radio signal. It has lower group L for a go-channel, and higher group H for a return channel. Each group has the similar structure. The lower group has three sub-system signals sys.1, sys.2 and sys.3, each having three carriers (A, B, C), (D, E, F) and (G, H, I). The radio signal is frequency converted by using local frequencies C1, C2 and C3, and three IF frequency signals are obtained as shown in FIG. 7A(b), for the related sub-system signals. Each of those sub-system signals is input to the auto-gain controller 116 in FIG. 6B. The hybrid circuit 130 and the bandpass filters 132-a, 132-b 132-c separates three carriers A, B and C in the sub-system signal sys.1 as shown in FIG. 7A(c). Each of those carriers is output from the bandpass filters in FIG. 6B. After the amplification, those three carriers A, B and C are added in the adder 136, as shown in FIG. 7A(d).

Then, three sub-system signals at IF band are frequency converted to radio frequency by using local frequencies C1', C2' and C3'. The frequency conversion generates a pair of side bands, an upper heterodyne, and a lower heterodyne, as shown in FIG. 7A(e), which relates to the output of the mixer 138 in FIG. 6B. An upper heterodyne is defined such that the local frequency is higher than the radio frequency, and a lower heterodyne is defined such that the local frequency is lower than the radio frequency. As the lower heterodyne is received in the first frequency conversion (FIG. 7A(a)), the same lower heterodyne is received in the second frequency conversion. The selection of the lower heterodyne is carried out in the bandpass filter 139 in FIG. 6A. Then, the signal as shown in FIG. 7A(f) is obtained at the output of the band splitting filter 24 in FIG. 6A. If the upper heterodyne were received, the output of the band splitting filter would be FIG. 7A(g).

FIG. 7B shows frequency allocation of one sub-system signal sys.1 (A, B, C). The receiving radio frequency (FIG. 7B(a)) is frequency converted, and separated into three carriers A, B, C by three bandpass filters 132-a, 132-b, 132-c in FIG. 6B. The left column in FIG. 7B ((b), (c), (d) and (e)) shows the case where the lower heterodyne is taken, and the right column ((b'), (c'), (d') (e')) shows the case where the upper heterodyne is taken. In the case of the lower heterodyne, for example, the output of the bandpass filter 132-a has not only the desired carrier A, but also a part of adjacent carrier B as B' as shown in FIG. 7B(b). Similarly, the carrier B accompanies a part of the carriers A and C as A' and C' as shown in FIG. 7B(c), and the carrier C accompanies a part of the carrier B as B' as shown in FIG. 7B(d). After the carriers A, B, and C which accompany leakage of adjacent carriers, are amplified, they are combined in the adder 136, and then, frequency converted to radio frequency as shown in FIG. 7B(e).

It should be appreciated in FIG. 7B(e) that no leakage from another sub-system signal exists in the sub-system signal, and each main carrier (A, B, C) has only leakage of its own carrier (A', B', C') As the leakage A' is in-phase as the main carrier A, those carriers A and A' are combined in-phase at the radio frequency band, and the distortion by A' is compensated by a transversal equalizer installed at a receiving terminal station, or a is regenerative repeater station, when the carrier A equalized. This operation for equalization is similar to conventional equalization for multipath interference. Similarly, the leakages B' and C' are combined with the main carriers B and C, in-phase, and the distortion by B' and C' are compensated by a transversal equalizer. A similar operation is carried out when an upper heterodyne is taken as shown in FIG. 7B((b'), (c'), (d'), (e')).

It should be noted that the leakage of a signal to an adjacent channel occurs anytime if a bandpass filter and/or a band splitting filter is used for separating channels. The embodiment of FIG. 6A shows the case when a bandpass filter is provided at a radio frequency band for separating and combining sub-system signals, and IF frequency band for separating and combining carriers. The present invention is useful for the case which has a bandpass filter only at a radio frequency band, or only at IF frequency band.

Figure 8:
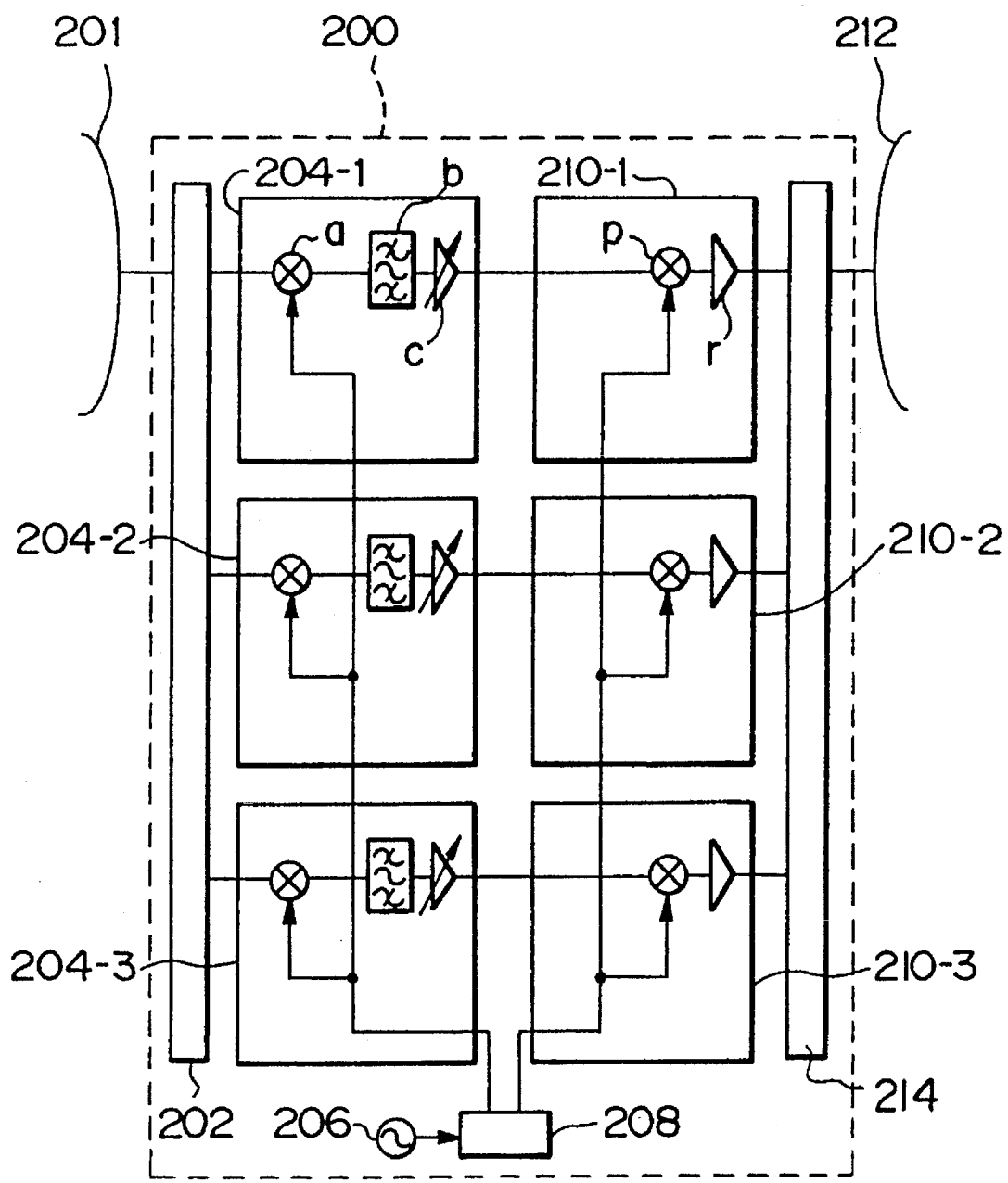
FIG. 8 shows a block diagram of another embodiment of the present invention.

FIG. 8 shows a block diagram of a non-regenerative repeater station in another embodiment of the present invention.

In FIG. 8, a non-regenerative repeater station 200 has an antenna 201, a band splitting filter 202, three receivers 204-1, 204-2 and 204-3, three transmitters 210-1, 210-2 and 210-3, another band splitting filter 214, an antenna 212, a common reference oscillator 206, and a common reference phase lock oscillator 208, which supplies a common reference local frequency to all the receivers and all the transmitters. The feature of the embodiment of FIG. 8 is that only a single phase lock oscillator 208 is provided for supplying the local frequency to all the receivers and all the transmitters for all the sub-system signals. Therefore, IF frequency depends upon each sub-system signal, while the IF frequency in the embodiment of FIG. 6A is fixed. The embodiment of FIG. 8 has the advantage that only one phase lock oscillator 208 is enough, and therefore, the structure of a repeater is simplified. A space diversity, and/or dual reference oscillators is of course possible in FIG. 8, as is the case of FIG. 6A.

FIG. 9 shows numerical embodiments of the transmitting frequencies and the receiving frequencies in a non-regenerative repeater station. FIG. 9(a) shows the case of 4 GHz band, FIG. 9(b) shows the case of 5 GHz band, and FIG. 9(c) shows the case of 6 GHz band. The right column and the left column show go-channel and return channel, or vice versa. The figure in a parenthesis shows the local frequency for frequency conversion.

In 4 GHz band, 3640, 3700 and 3760 MHz are used for each sub-system signals in the go-channel with the local frequency 3510, 3570 and 3630 MHz. As for the return-channel, 3980, 4040 and 4100 MHz with the local frequencies 3850, 3910 and 3970 MHz are used for each sub-system signals. Therefore, the reference frequency of an oscillator 104 (FIG. 6A) is determined to be 1 MHz, 5 MHz or 10 MHz, which is a common divisor of the local frequencies (3510, 3570, 3630,3850, 3910, 3970).

In 5 GHz band, radio frequencies are 4440, 4500 and 4560 MHz for each sub-system signals in the go-channel with the local frequencies 4310, 4370 and 4430 MHz. As for the return-channel, 4780, 4840, 4900 MHz with the local frequencies 4650, 4710 and 4770 MHz.

In 6 GHz band, 5955, 6015 and 6075 MHz are used for the go-channel with the local frequencies 5825, 5885 and 5945 MHz. As for the return-channel, 6215, 6275 and 6335 MHz are used with the local frequencies 6085, 6145 and 6205 MHz. Therefore, the reference frequency of the oscillator 104 is 1 MHz or 5 MHz, but 10 MHz is not used.

Figure 10:
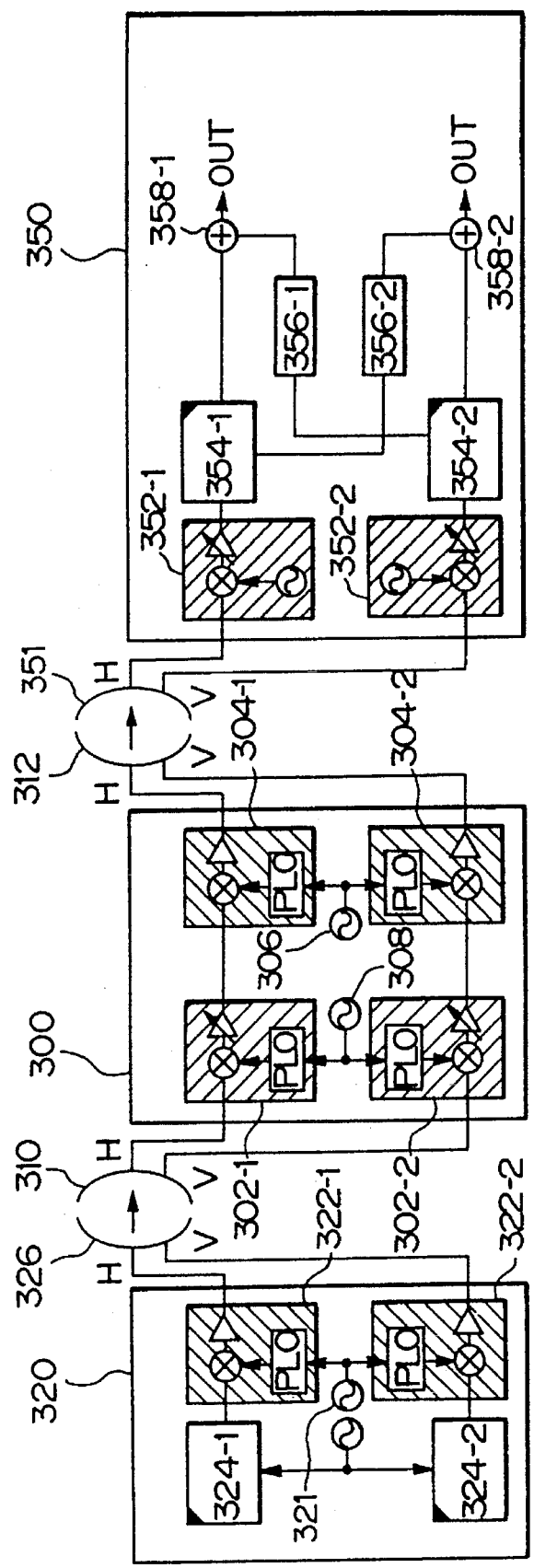
FIG. 10 is a block diagram of still another embodiment of the present hybrid digital radio-relay system.

FIG. 10 shows a block diagram of a non-regenerative digital radio-relay system of still another embodiment of the present invention. FIG. 10 shows the application of the present invention to cross polarization communication, which uses a horizontal polarized wave and a vertical polarized wave.

In FIG. 10, a transmitting terminal station has a pair of modulators 324-1 and 324-2, which are coupled with a pair of transmitters 322-1 and 322-2, respectively. Each transmitter has a phase lock oscillator, a frequency mixer and a high power amplifier. The transmitters 322-1 and 322-2 are supplied with the common reference frequency for frequency conversion to radio frequency by the common oscillator 321 so that the H polarized wave from the first transmitter 322-1 is in-phase with the V polarized wave from the second transmitter 322-2. The H polarized wave and the V polarized wave are transmitted through an antenna 326.

A non-regenerative repeater station 300 has an antenna 310 for receiving the H polarized wave and V polarized wave, which are applied to the receivers 302-1 and 302-2, respectively. Each receiver has a frequency mixer for converting radio frequency to IF frequency, a phase lock oscillator, and an auto-gain controller. The two receivers 302-1 and 302-2 are supplied the common reference frequency by the common reference oscillator 308. The output of the receivers is applied to the transmitters 304-1 and 304-2, each having a frequency mixer for converting IF frequency to radio frequency, a phase lock oscillator, and a high power amplifier. Two transmitters 304-1 and 304-2 are supplied the common reference frequency for frequency conversion by the common reference oscillator 306 so that the radio frequency of the H polarized wave of the first transmitter 304-1 is in-phase with that of the V polarized wave of the second transmitter 304-2. The H polarized wave and the V polarized wave are transmitted through an antenna 312 towards a receiving terminal station 350.

A receiving terminal station 350 has an antenna 351 which is coupled with a pair of receivers 352-1 and 352-2 each having a frequency mixer for converting radio frequency to IF frequency with a local oscillator, and an auto-gain controller. The outputs of the receivers is are applied to the demodulators 354-1, and 354-2, respectively, to demodulate the signal. The outputs of the demodulators 354-1 and 354-2 are applied to the cross polarization interference canceller 356-2 and 356-1, respectively, and the adders 358-1 and 358-2, respectively. Each cross polarization interference canceller compensates cross polarization interference from the H polarized wave to the V polarized wave, and from the V polarized wave to the H polarized wave.

It should be noted that the cross polarization interference generated between the transmitting terminal station 320 and the repeater station 300 is in-phase with the cross polarization interference generated between the repeater station 300 and the receiving terminal station 350, since the transmitters 322-1 and 322-2 in the transmitting terminal station 320 is supplied with the common local frequency, the receivers 302-1 and 302-2 in the repeater 300 are supplied with the common local reference frequency, and the transmitters 304-1 and 304-2 in the repeater 300 are supplied with the common local reference frequency. Therefore, the cross polarization interference canceller 356-1 and 356-2 compensate the cross polarization interference completely, although a repeater is not a regenerative repeater, but a non-regenerative repeater.

It should be appreciated that the combination of the embodiment of FIG. 10 with that of FIG. 6A is possible to compensate Self-Interference Caused by Passing Adjacent Channels (S-IPAC). In that case, a transmitter 304-1 (or 304-2) takes the same heterodyne as that of a receiver 302-1 (or 302-2).

Figure 11:
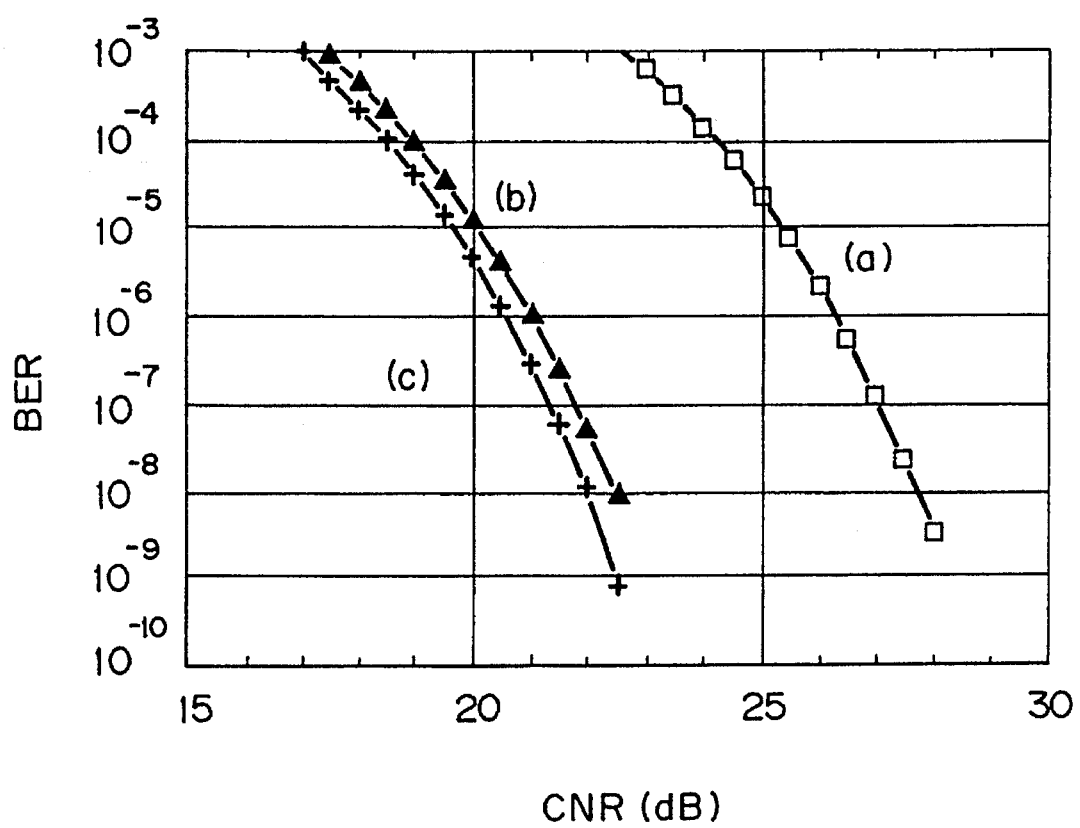
FIG. 11 shows experimental characteristics showing the effect of the present invention.

FIG. 11 shows the characteristics in experimental simulation showing the effect of the present invention, in which the horizontal axis shows CNR (carrier power to noise power ratio) in dB of an input of a receiving terminal station, and the vertical axis shows BER (bit error rate). The curves show the case of a 16 QAM communication system with two non-regenerative repeater stations. The curve (c) shows the case of a prior art using a regenerative repeater, the curve (a) shows the case of a non-regenerative repeater station and no transversal equalizer in a receiving terminal station, and the curve (b) shows the case of a non-regenerative repeater station and a transversal equalizer in a receiving terminal station. It should be appreciated that the curve (b) which is the case of the present invention provides the similar characteristics to that of a regenerative repeater case of the curve (c), although a repeater station of the curve (b) is a non-regenerative repeater station. The difference of CNR of the curves (b) and (c) for each given BER is only less than 0.5 dB.

From the foregoing, it will now be apparent that a new and improved hybrid digital radio-relay system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A hybrid digital radio-relay system comprising:
    a transmitting terminal station having a plurality of transmitter sub-units for respective sub-system signals, each sub-unit having a modulator for modulating a signal, and a transmitter for converting frequency of the modulated signal to a radio frequency and providing high transmitting power, and a band splitting filter for combining radio signals of all the sub-units to transmit from an antenna, at least one repeater station having a band splitting filter for separating a received signal into a plurality of sub-system signals applied to respective repeater sub-units, each having a first frequency converter for converting a received radio frequency to IF frequency, an auto-gain controller having an amplifier, and a second frequency converter for converting amplified IF frequency to radio frequency and providing high transmitting power, and another band splitting filter for combining radio signals of all the sub-units to transmit from an antenna, a receiving terminal station having a band splitting filter for separating a received signal into sub-system signals applied to respective receiver sub-units, each having a receiver for converting a received radio frequency into IF frequency which is subject to detection, a demodulator for demodulating the received signal, and an equalizer coupled with an output of said demodulator for equalizing waveform distortion of the received signal during propagation between said transmitting terminal station and said receiving terminal station, wherein said at least one repeater station is a non-regenerative repeater station which does not regenerate a digital symbol of the modulated signal, said non-regenerative repeater station has a common reference oscillator which supplies a local frequency to both said first frequency converter of all the sub-units and said second frequency converter of all the sub-units with in-phase condition, and said second frequency converter receives a same heterodyne, selected from an upper heterodyne and a lower heterodyne, as that of said first frequency converter, so that interference caused by an adjacent sub-system signal, which is leaked into the sub-system signal, is compensated by the equalizer in the receiving terminal station.

2. A hybrid digital radio-relay system according to claim 1, wherein said frequency converters have a phase lock loop.

3. A hybrid digital radio-relay system according to claim 1, wherein a oscillation frequency of said common reference oscillator is a common divisor of all the local frequencies for all the radio frequencies in said non-regenerative repeater station.

4. A hybrid digital radio-relay system according to claim 1, wherein said repeater station has a plurality of receiving antennas for space diversity combination.

5. A hybrid digital radio-relay system according to claim 1, wherein a second common reference oscillator is provided so that said second common reference oscillator is switched to a first common reference oscillator when the first common reference oscillator is in trouble.

6. A hybrid digital radio-relay system according to claim 1, wherein said equalizer installed in said receiving terminal station is a transversal equalizer.

7. A hybrid digital radio-relay system according to claim 1, wherein more than two non-regenerative repeater stations are provided between a transmitting terminal station and a receiving terminal station.

8. A hybrid digital radio-relay system according to claim 1, wherein the local frequency to all the repeater sub-units is supplied from a common reference oscillator through a common reference phase lock loop, so that IF frequency depends upon sub-system signals.

9. A hybrid digital radio-relay system according to claim 1, wherein a transmitter in a repeater has a bandpass filter for taking a predetermined heterodyne selected from the upper heterodyne and the lower heterodyne.

10. A hybrid digital radio-relay system according to claim 1, wherein said transmitting terminal station has a pair of transmitters, said repeater station has a pair of receivers and a pair of transmitters, and said receiving terminal station has a pair of receivers for communication with vertical polarization and horizontal polarization, said pair of receivers in said repeater station have a common local oscillator, and said pair of transmitters in said repeater station have another common local oscillator, so that cross polarization interference between a propagation path is compensated in a cross polarization interference canceller installed in said receiving terminal station.

11. A hybrid digital radio-relay system according to claim 1, wherein said transmitting terminal station has a pair of transmitters, said repeater station has a pair of receivers and a pair of transmitters, and said receiving terminal station has a pair of receivers for communication with a vertical polarization and a horizontal polarization, said pair of receivers and said pair of transmitters in said repeater station have a common local oscillator, so that cross polarization interference between a propagation path is compensated in a cross polarization interference canceller installed in said receiving terminal station.

12. A hybrid digital radio-relay system comprising:

a transmitting terminal station having a plurality of modulators for modulating input signals, means for multiplexing modulated signals, and means for converting said modulated signals to radio frequency, at least one repeater station having a first frequency converter for converting a received radio frequency to IF frequency, means for de-multiplexing signals to each carrier, auto-gain controllers having amplifiers for amplifying each carrier at IF band, means for multiplexing each amplified carrier, and a second frequency converter for converting IF frequency to radio frequency, a receiving terminal station having means for converting a received radio frequency to IF frequency, means for de-multiplexing signals to each carrier, means for demodulating each received signal, and equalizers for equalizing each demodulated signal, wherein said at least one of the repeater stations is a non-regenerative repeater station which does not regenerate a digital symbol of a signal, said non-regenerative repeater station has a common reference oscillator which supplies a local frequency to both said first frequency converter and said second frequency converter with in-phase condition, and said second frequency converter receives a same heterodyne, selected from an upper heterodyne and a lower heterodyne, as that of said first frequency converter.

\* \* \* \* \*